United States Patent
Koide et al.

(10) Patent No.: US 8,897,142 B2
(45) Date of Patent: Nov. 25, 2014

(54) COMMUNICATION MONITORING DEVICE

(75) Inventors: Kazuhiro Koide, Kahoku (JP); Shinya Imamura, Kahoku (JP)

(73) Assignee: PFU Limited, Kahoku-shi (JP)

( * ) Notice: Subject to any disclaimer, the term of this patent is extended or adjusted under 35 U.S.C. 154(b) by 398 days.

(21) Appl. No.: 12/906,452

(22) Filed: Oct. 18, 2010

(65) Prior Publication Data

US 2011/0252128 A1 Oct. 13, 2011

(30) Foreign Application Priority Data

Apr. 8, 2010 (JP) ................................ 2010-089567

(51) Int. Cl.
*H04L 12/28* (2006.01)
*H04L 29/06* (2006.01)

(52) U.S. Cl.
CPC .................................. *H04L 63/1408* (2013.01)
USPC ........................................... 370/241; 709/224

(58) Field of Classification Search
USPC ........................... 709/221, 220, 229; 370/254
See application file for complete search history.

(56) References Cited

U.S. PATENT DOCUMENTS

| 7,474,655 | B2 | 1/2009 | Aoki et al. | |
|---|---|---|---|---|
| 7,725,932 | B2 | 5/2010 | Aoki et al. | |
| 7,979,582 | B2 * | 7/2011 | Okazaki et al. | 709/245 |
| 7,991,860 | B2 * | 8/2011 | Otani | 709/221 |
| 2003/0115345 | A1 * | 6/2003 | Chien et al. | 709/229 |
| 2006/0059552 | A1 | 3/2006 | Aoki et al. | |
| 2008/0056160 | A1 * | 3/2008 | Kamada et al. | 370/254 |
| 2009/0007254 | A1 | 1/2009 | Aoki et al. | |

FOREIGN PATENT DOCUMENTS

| JP | 4082613 B2 | 4/2008 |
|---|---|---|
| JP | 2008-271242 A | 11/2008 |

* cited by examiner

*Primary Examiner* — Kevin C Harper
*Assistant Examiner* — Derrick V Rose
(74) *Attorney, Agent, or Firm* — Westerman, Hattori, Daniels & Adrian, LLP

(57) ABSTRACT

A communication monitoring device 20 includes a first communication guidance unit 23 which guides a communication from a inspection target node 90 to the communication monitoring device 20, a second communication guidance unit 24 which guides, to the communication monitoring device 20, the communication to the inspection target node 90 from another information processing device, a transmitting/receiving unit 25 which receives the communication addressed to the communication monitoring device 20, a guidance success determining unit 26 which determines, when receiving the communication addressed to the communication monitoring device 20 from the inspection target node 90, that the first communication guidance unit 23 succeeds in the guidance, and a communication guidance canceling unit 28 which cancels, when determining that the first communication guidance unit 23 succeeds in the guidance, the communication guidance of the second communication guidance unit 24.

9 Claims, 7 Drawing Sheets

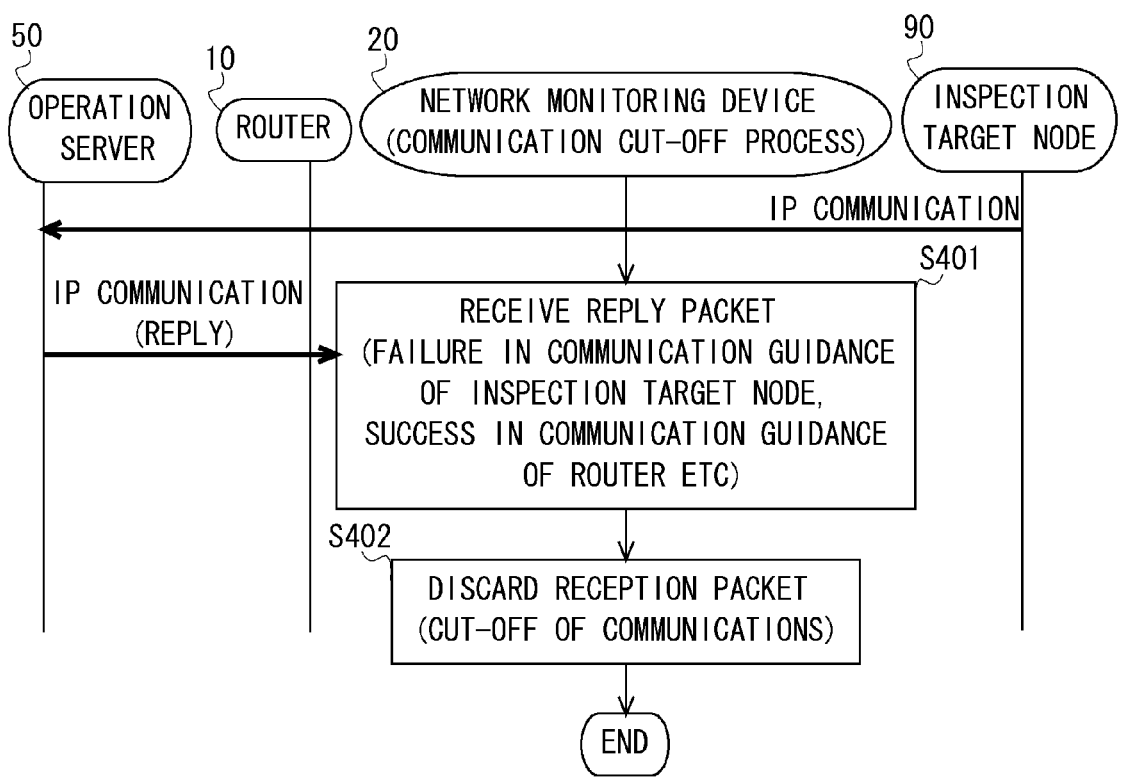

COMMUNICATION MONITORING DEVICE

This application is based upon and claims the benefit of priority of the prior Japanese Patent Application No. JP2010-089567, filed on Apr. 8, 2010, the entire contents of which are incorporated herein by reference.

FIELD

The present invention relates to a communication monitoring device which monitors a communication of an information processing device connected via a network.

BACKGROUND

A network monitoring device has hitherto existed, which guides, to the self-device, a packet coming from a pre-inspection terminal by sending as a response a MAC (Medial Access Control) address of the self-device if a sender terminal of a received ARP (Address Resolution Protocol) request packet is in a pre-inspection status (refer to Japanese Patent Laid-Open Publication No. 2008-271242).

Further, a countermeasure device has also existed, which restricts a communication service of a control target computer by changing a communication address, recorded in a first computer, of a second computer to a communication address of the countermeasure device and changing the communication address, recorded in the second computer, of the first computer to the communication address of the countermeasure device (refer to Japanese Patent Publication No. 4082613).

SUMMARY

A case of making an information processing device participate in a network have hitherto involved using a technology of monitoring the communication on the network and giving restrictions corresponding to the status, such as [inspection], which is checking an environment of the participant information processing device (checking whether mainly the security-related environment satisfies a predetermined security policy or not) and permitting the device to participate in the network only when satisfying the predetermined condition, and capturing, restricting and redirecting the communication on the network. Then, such a scheme as to monitor or restrict the communication involves employing a technology of guiding, to the communication monitoring device, the communication coming from a target information processing device (which will hereinafter be also a [target device]), and this technology is exemplified such as guiding the communication coming from the target device to the communication monitoring device by notifying the target device of a physical address of the communication monitoring device as a physical address of a device with which the target device wants to perform the communication.

There is, however, a case of disabling the communication from being guided depending on a type of the information processing device connected to the network. For example, in the case of guiding the communication by notifying a physical address of a destination of the guidance in order to inspect the information processing device participating in the network, and the communication for the guidance is recognized as an invalid communication, with the result that there occurs an information processing device unable to undergo the normal inspection. This type of information processing device, when connected to the network, might be enabled in an uninspected status to perform the communications with an internal network and an external network, and a possibility is that the network security decreases.

It is an object of the present invention, in view of the problems described above, to restrict a communication related to an information processing device even in the case of the information processing device that is hard to guide the communication to a communication monitoring device.

Means for Solving the Problems

The present invention solves the problems described above by taking the following configuration. Namely, the present invention is a communication monitoring device to monitor a communication of an information processing device in a network, the device including: a first communication guidance unit to guide the communication coming from a target device in the information processing devices to the communication monitoring device; a second communication guidance unit to guide, to the communication monitoring device, the communication to the target device from the information processing device other than the target device; a receiving unit to receive the communication addressed to the communication monitoring device; a guidance success determining unit to determine, if the receiving unit receives the communication addressed to the communication monitoring device from the target device, that the first communication guidance unit succeeds in the guidance; and a communication guidance canceling unit to cancel, if the guidance success determining unit determines that the first communication guidance unit succeeds in the guidance, the communication guidance of the second communication guidance unit.

In the present invention, the target device is a communication monitoring or restricting target information processing device, and the communication monitoring device according to the embodiment guides the communication related to the target device to the communication monitoring device. As described above, however, depending on a type of the information processing device, the communication can not be guided, while the communications with the internal network and the external network can be performed. Such being the case, the present invention can restrict the communication related to the target device, even when the guidance of the communication from the target device becomes unsuccessful, by guiding to the communication monitoring device the communication to the target device from the information processing device other than the target device.

Moreover, in the present invention, in the case of receiving the communication addressed to the communication monitoring device from the target device, the communication guidance for the target device is determined to be successful, while the communication guidance for the information processing device other than the target device is canceled. With this scheme, it is feasible to save resources by not conducting the communication guidance for another unnecessary device when succeeding in the communication guidance for the target device and to get the communications with the internal network and the external network to be immediately performed when permitting the communication of the target device by completing the inspection of the target device.

Further, in the present invention, the first communication guidance unit may guide the communication coming from the target device to the communication monitoring device by notifying the target device of a physical address of the communication monitoring device as a physical address of another device, and the guidance success determining unit may determine, if the receiving unit receives the communication addressed to the physical address of the communication monitoring device from the target device, that the first communication guidance unit succeeds in the guidance.

A specific method of guiding the communication related to the target device to the communication monitoring device is exemplified by a method of notifying a want-to-guide-the-communication terminal of the physical address of the destination of the guidance and thus inducing the terminal to communicate with the communication monitoring device, however, the communication guidance may involve adopting other methods. Furthermore, the ARP is known as a technique of notifying of the physical address, however, a packet used for the notification may be an ARP request (including a GARP packet) and may also be an ARP response packet. This is the same with the communication guidance by the second communication guidance unit that will hereinafter be described.

Still further, in the present invention, the second communication guidance unit may guide, to the communication monitoring device, the communication to the target device from the information processing device other than the target device by notifying the information processing device other than the target device of the physical address of the communication monitoring device as the physical address of the target device, and the communication guidance canceling unit may cancel the communication guidance of the second communication guidance unit by notifying the information processing device other than the target device of the physical address of the target device.

Yet further, in the present invention, the second communication guidance unit may guide, to the communication monitoring device, the communication, relayed by a communication relay device to relay the communication between the target device and the external network, to the target device from an external network by notifying the communication relay device of the physical address of the communication monitoring device as the physical address of the target device, and the communication guidance canceling unit may cancel the communication guidance of the second communication guidance unit by notifying the communication relay device of the physical address of the target device.

Namely, the device for which the second communication guidance unit guides the communication may be the information processing device other than the target device within the network and may also be the communication relay device such as a router and a gateway. In the case of conducting the communication guidance for the communication relay device such as the router and the gateway, the communications relayed by these communication relay devices from the external network can be guided en bloc.

Yet further, the communication monitoring device according to present invention may further include a guidance failure determining unit to determine, if a response to the guidance of the first communication guidance unit is not received based on a predetermined condition, that the first communication guidance unit fails in the guidance, wherein the second communication guidance unit, if the guidance failure determining unit determines that the first communication guidance unit fails in the guidance, may guide, to the communication monitoring device, the communication to the target device from the information processing device other than the target device.

As explained above, the first communication guidance unit might fail in the communication guidance for the target device due to a communication content analyzing function etc provided in the target device, depending on the target device. Therefore, a scheme of the present invention is that the failure in the communication guidance of the first communication guidance unit is determined by determining whether or not the response from the target device with respect to the communication guidance of the first communication guidance unit is received based on the predetermined condition, and, if determined to be unsuccessful, the second communication guidance unit guides the communication for another information processing device, thus restricting the communication related to the target device. Herein, the "predetermined condition" is a condition set for determining whether the communication guidance of the first communication guidance unit becomes successful or not, and, e.g., a response rate to the notification of the physical address for the communication guidance, existence or non-existence of the response, a content of the response, etc are each set as the predetermined condition. This scheme can restrict the communication related to the target device while avoiding the unnecessary communication guidance of the second communication guidance unit.

Moreover, in the present invention, the first communication guidance unit may periodically guide the communication to the communication monitoring device from the target device.

The first communication guidance unit periodically guides the communication (by, to be specific, notifying of, e.g., the physical address), whereby the failure in the communication guidance is determined periodically and the second communication guidance unit can guide the communication corresponding to the occasion.

Furthermore, the communication monitoring device according to the present invention may further include a communication cut-off unit to cut off at least a part of the communication related to the target device by not forwarding at least a part of the guided communication.

Herein, the term "cut-off of the communication" connotes preventing the information processing device from performing the communication by use of some method. A communication cut-off method may adopt a method of cutting off the communication by intercepting the packet etc transmitted from another information processing device and preventing the cut-off target communication from being forwarded, and, in addition, a variety of methods such as a method of physically cutting off the communication.

Moreover, the present invention can be grasped as a method executed by a computer or a program to make the computer execute the method. Furthermore, the present invention may also be a recording medium recorded with this program, which can be read by the computer, other devices and machines. Herein, the recording medium readable by the computer etc includes a recording medium capable of storing information such as data and programs electrically, magnetically, optically, mechanically or by chemical action, which can be read from the computer etc.

According to the present invention, it is feasible to restrict the communication related to the information processing device even in the case of the information processing device that is hard to guide the communication to the communication monitoring device.

BRIEF DESCRIPTION OF THE DRAWINGS

FIG. 7 is a flowchart illustrating a flow of a communication cut-off process according to the embodiment.

DESCRIPTION OF EMBODIMENTS

An embodiment of a quarantine system 1 including a communication monitoring device according to the present invention will hereinafter be described with reference to the drawings. The communication monitoring device according to the present invention can, however, be employed for monitoring and restricting the communications also in a system which does not inspect.

<System Architecture>

Figure 1:
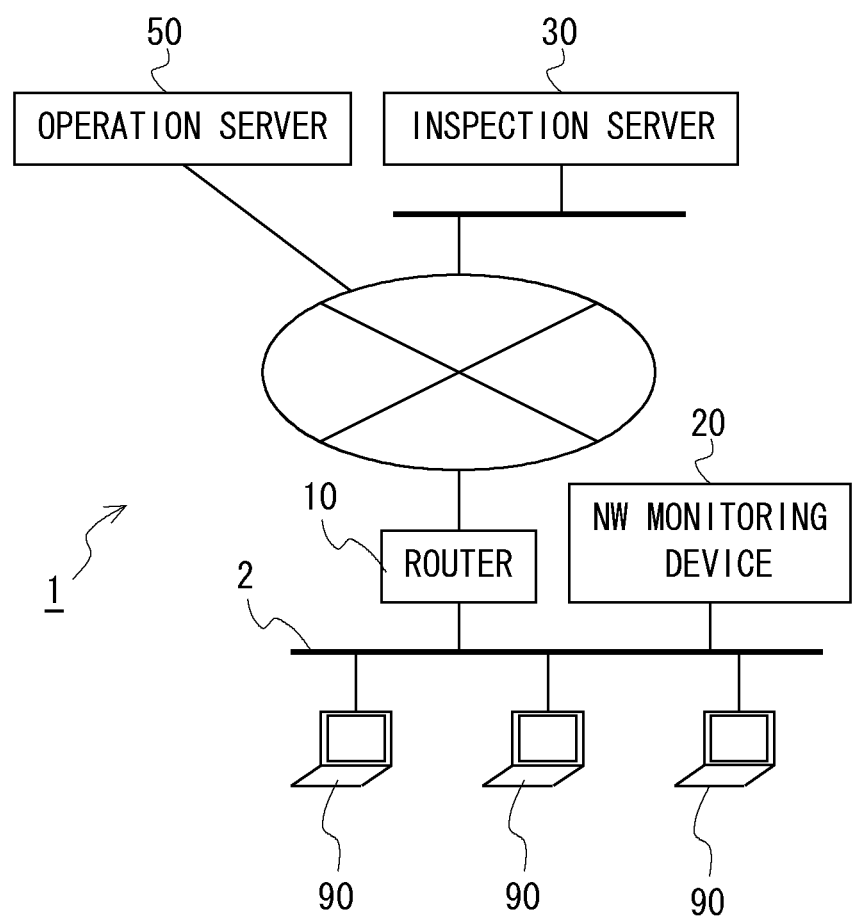
FIG. 1 is a schematic diagram illustrating architecture of a quarantine system according to an embodiment.

FIG. 1 is a schematic diagram illustrating architecture of the quarantine system 1 according to the embodiment. The quarantine system 1 according to the embodiment includes a network segment 2 to which an information processing device 90 becoming an inspection target device (which will hereinafter be referred to as a [inspection target node 90]) is connected, an operation server 50 connected in a communication-enabled manner to the network segment 2 via a router 10 and an inspection server 30 connected in the communication-enabled manner to the network segment 2 via the router 10. Then, a network monitoring device 20, which serves to cut off the communications of the inspection target node 90, of which the inspection is not yet completed, is connected to the network segment 2.

Note that the network monitoring device 20 corresponds to a communication monitoring device according to the present invention, and the router 10 corresponds to a communication relay device according to the present invention. Further, the operation server 50 provides an operation service to the inspection target node 90, and the inspection server 30 provides an inspection service to the inspection target node 90 connected to the network segment 2.

It should be noted that in the quarantine system 1 according to the embodiment, a variety of servers to which the inspection target nodes 90 are connected may not, though connected at remote places via the Internet and a wide area network (WAN) and provided by, e.g., ASP (Application Service Provider), be necessarily connected at the remote places. For example, these servers may also be connected to a local area network (LAN) where the inspection target nodes 90 and the network monitoring device 20 exist.

Figure 2:
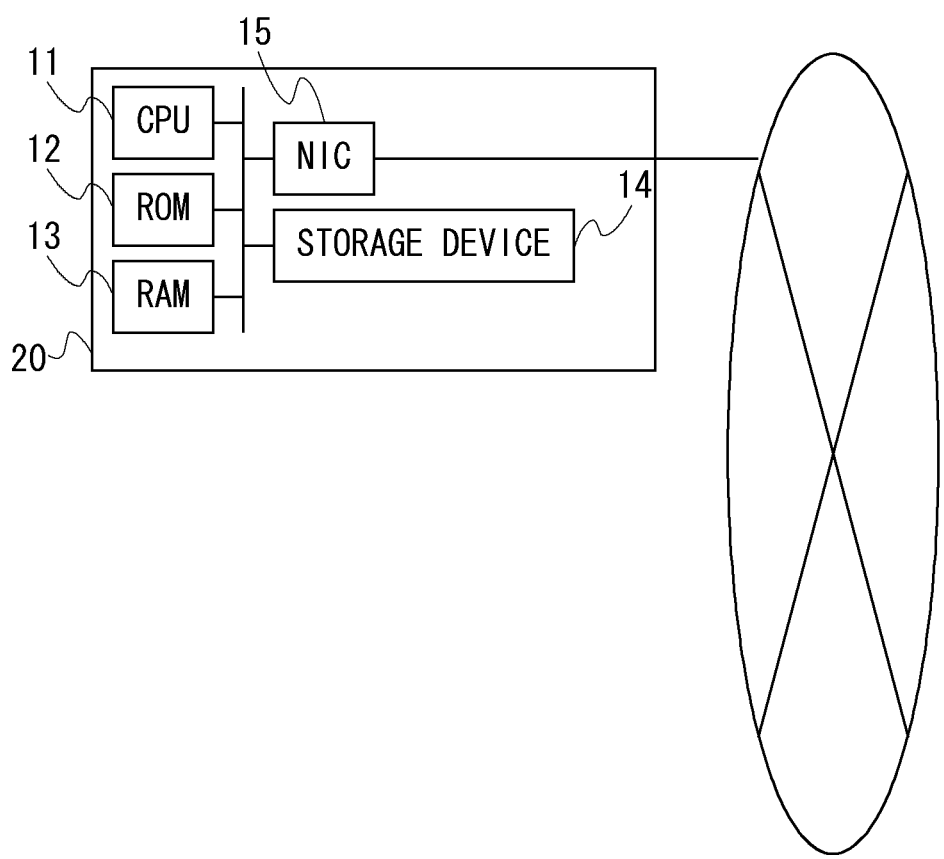
FIG. 2 is a diagram illustrating a hardware configuration of a network monitoring device according to the embodiment.

FIG. 2 is a diagram illustrating a hardware configuration of the network monitoring device 20 according to the embodiment. Note that FIG. 2 omits illustrations of components (the router 10, the inspection server 30, the inspection target node 90, the operation server 50, etc) other than the network monitoring device 20. The network monitoring device 20 is a computer equipped with a CPU (Central Processing Unit) 11, a RAM (Random Access Memory) 13, a ROM (Read Only Memory) 12, a storage device 14 such as an EEPROM (Electrically Erasable and Programmable Read Only Memory) and a HDD (Hard Disk Drive), a communication unit such as a NIC (Network Interface Card) 15 and so on.

Figure 3:
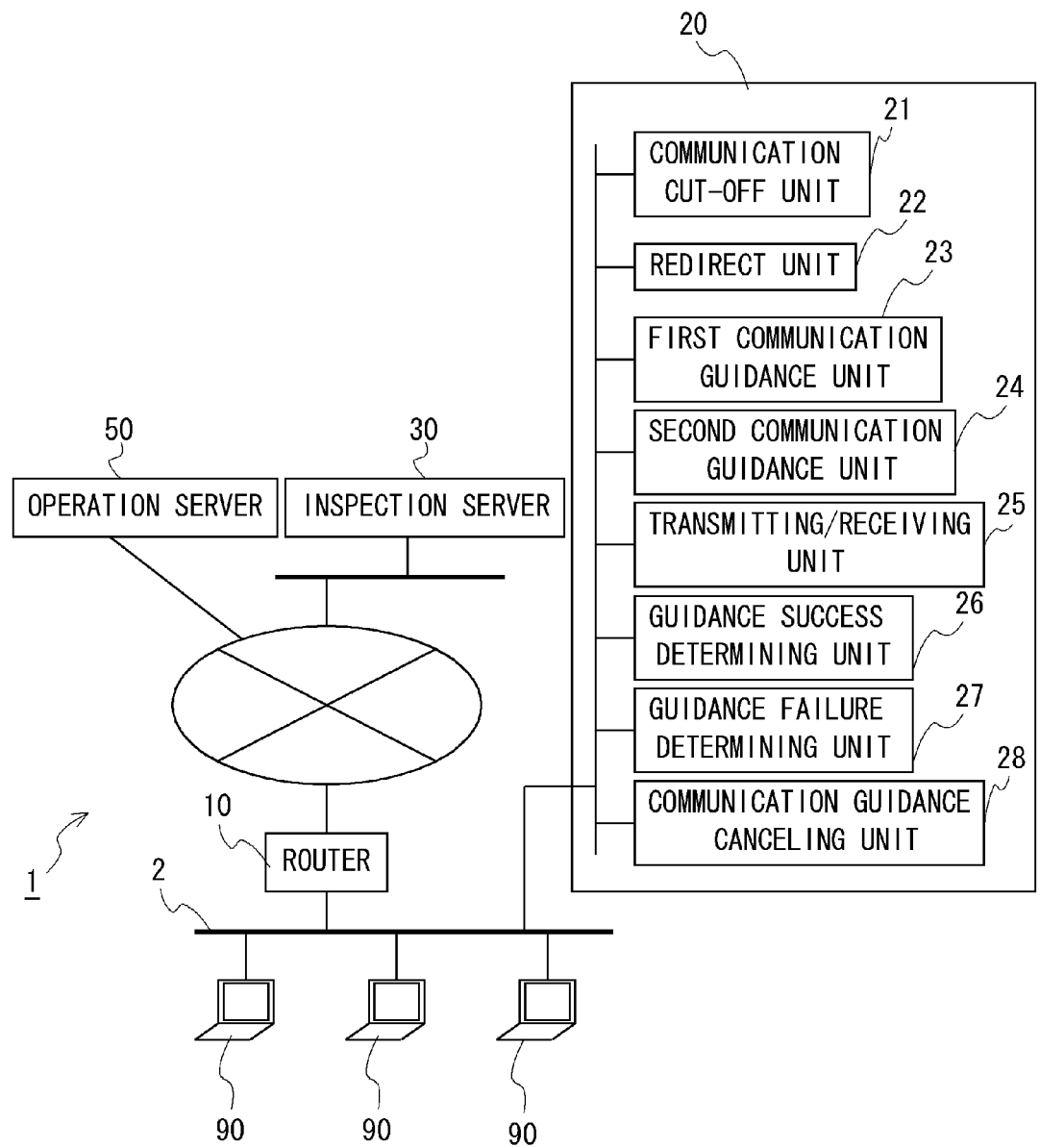
FIG. 3 is a diagram illustrating an outline of a functional configuration of the network monitoring device according to the embodiment.

FIG. 3 is a diagram schematically illustrating a functional configuration of the network monitoring device 20 according to the embodiment. A program recorded in the storage device 14 is read into the RAM 13 and executed by the CPU 11, whereby the network monitoring device 20 functions as a communication monitoring device including a communication cut-off unit (module) 21, a redirect unit (module) 22, a first communication guidance unit (module) 23, a second communication guidance unit (module) 24, a transmitting/receiving unit (module) 25, a guidance success determining unit (module) 26, a guidance failure determining unit (module) 27 and a communication guidance canceling unit (module) 28. Note that the respective functions provided in the communication monitoring device are executed by the CPU 11 defined as the general-purpose processor in the embodiment, however, a part or the whole of these functions may also be executed by one single or a plurality of dedicated processors.

It is to be noted that in a process related to the embodiment which will be discussed as below, the first communication guidance unit 23 and the second communication guidance unit 24 may notify of a MAC (Media Access Control) address for guidance plural times at a time-interval in order to prevent an access list of guidance target devices from retaining the MAC address of which a valid communication partner device notifies. It is preferable that the number of times and the time-interval in the case of notifying plural times are properly set corresponding to the embodiment.

<Processing Flow>

Next, a flow of processes executed by the network monitoring device 20 according to the embodiment will hereinafter be described with reference to a flowchart.

Figure 4:
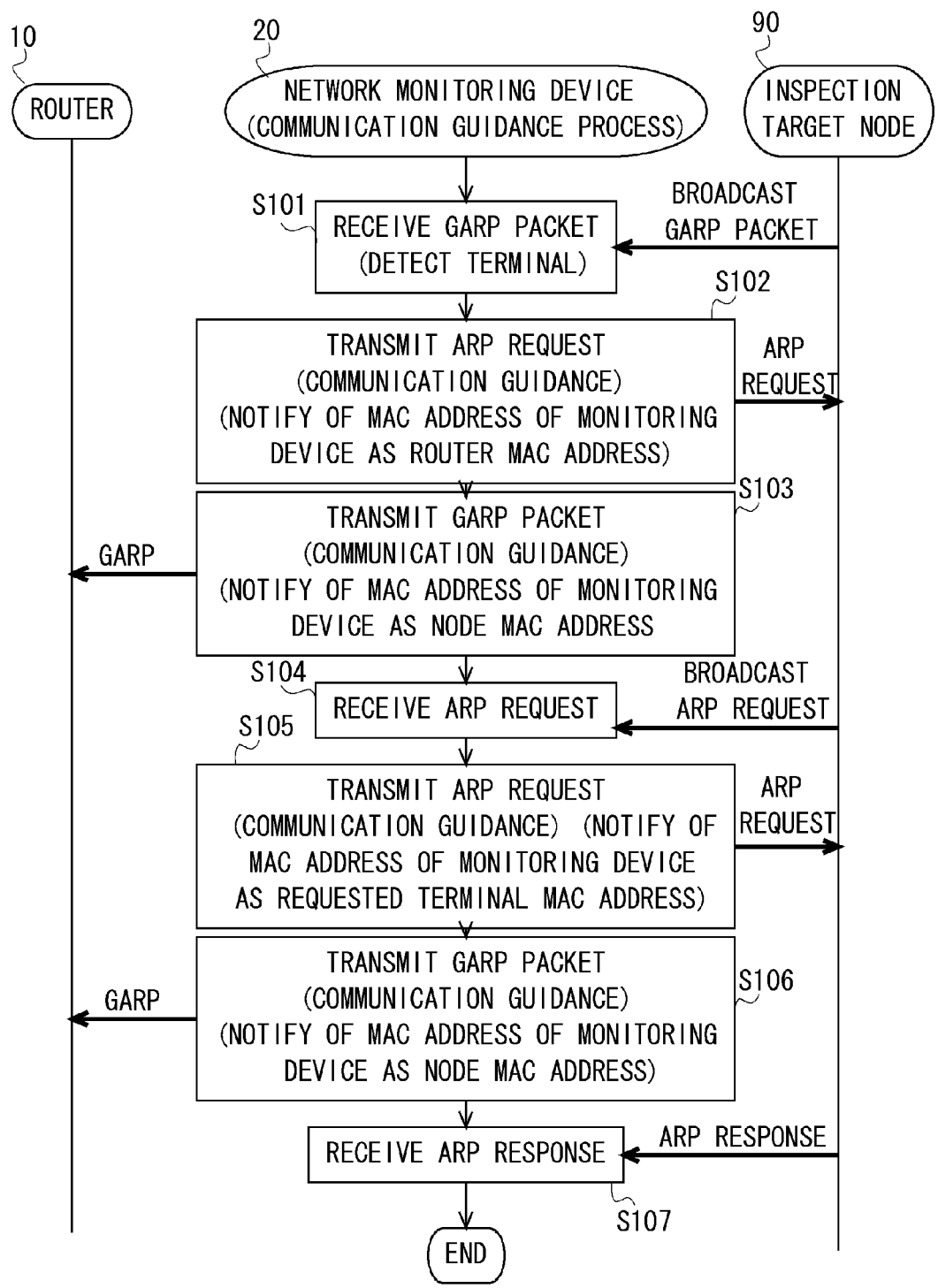
FIG. 4 is a flowchart illustrating a flow of a communication guidance process according to the embodiment.

FIG. 4 is a flowchart illustrating a flow of a communication guidance process according to the embodiment. A start of the communication guidance process according to the embodiment is triggered by an event that the inspection target node 90 of the user participates in the network segment 2 of the quarantine system 1 described above. Note that a specific content and a specific processing sequence of the process given in the flowchart are each one example for carrying out the present invention. The specific content and the specific processing sequence of the process given in the flowchart may be properly selected corresponding to the embodiment of the present invention.

In steps S101 and S102, upon detecting a connection of the inspection target node 90 that is not yet inspected (uninspected), the communication from the inspection target node 90 is guided to the network monitoring device 20. The inspection target node 90, which has participated in the network, broadcasts a GARP (Gratuitous ARP) packet for checking whether or not any terminal having an IP address overlapped with an IP address of this participant node 90 itself exists in the network. Note that the GARP packet is an ARP packet used for querying about the MAC address of the terminal having the IP address of the self-device (i.e., the inspection target node 90 as a packet sender in this case), and the inspection target node 90, if a response to the GARP packet is given from another device, determines that another terminal having the overlapped IP address exists within the network segment 2. The network monitoring device 20, when receiving the GARP packet broadcasted from the inspection target node 90, determines that a new terminal participates in the network (step S101).

The network monitoring device 20 determines whether or not the inspection target node 90 as the GARP packet sender is the inspected terminal, which involves using a method of comparing the MAC address of the inspection target node 90 as the GARP packet sender with the MAC address, retained by the network segment 2, of the inspected terminal. Then, the first communication guidance unit 23 of the network monitoring device 20, if the GARP packet sender is the uninspected inspection target node 90 (corresponding to a target device according to the present invention), transmits, to this inspection target node 90, an ARP address resolution request (which will hereinafter be simply referred to as an [ARP request]) for notifying of the MAC address of the network monitoring device 20 as the MAC address associated with the IP address of the router 10 (step S102). Namely, the MAC address, which is notified as the ARP request to the GARP packet sender terminal, masquerades the MAC address of the router 10 defined as a default gateway with the MAC address of the network monitoring device 20. In other words, the ARP request transmitted in step S102 is a communication guidance ARP request for inducing the inspection target node 90 to communicate with the network monitoring device 20 and thus guiding the subsequent communications with an external network from the inspection target node 90 to the network monitoring device 20. Thereafter, the processing proceeds to step S103.

The uninspected inspection target node 90 receiving the communication guidance ARP request sent from the network monitoring device 20 normally registers and thus retains, in an address list, the notified content, i.e., the MAC address of the network monitoring device 20 as the MAC address used for the communications with the external network (the operation server 50 etc). Therefore, it follows that the inspection target node 90 hereafter, in the case of trying the communications (addressed to, i.e., the external network) via the router 10, transmits the packet addressed to the masqueraded MAC address of the network monitoring device 20. Then, the network monitoring device 20, in general, does not forward but discards the packet transmitted from the uninspected inspection target node 90 in a way that excludes the communication needed for the inspection. In other words, the communication cut-off unit 21 of the network monitoring device 20 cuts off the communications performed by the uninspected inspection target node 90 by the method described above.

There might, however, be a case of determining from analyzing consistency of the communication content that the communication guidance ARP request transmitted from the network monitoring device 20 is not the request for notifying of a valid MAC address and of retaining none of the notified content, depending on the inspection target node 90.

In step S103, the communications with the inspection target node 90 from the external network are guided to the network monitoring device 20. The second communication guidance unit 24 of the network monitoring device 20 transmits, to the router 10, the GARP packet for notifying of the MAC address of the network monitoring device 20 as the MAC address associated with the IP address of the inspection target node 90. Namely, herein, the MAC address notified to the router 10 by use of the GARP packet masquerades the MAC address of the inspection target node 90 with the MAC address of the network monitoring device 20. In other words, this GARP packet is the communication guidance GARP packet for inducing the router 10 to communicate with the network monitoring device 20 and thus guiding the subsequent communications with the inspection target node 90, which come in via the router 10 from the external network, are guided to the network monitoring device 20.

Note that in step S103, the GARP packet similar to the packet transmitted to the router 10, i.e., the communication guidance GARP packet for notifying of the MAC address of the network monitoring device 20 as the MAC address associated with the IP address of the inspection target node 90 may also be transmitted to other information processing devices existing on the network segment 2 as well as to the router 10. A scheme being thus taken, inducing other information processing devices existing on the network segment 2 to communicate with the network monitoring device 20 and thus, with respect to the communications from other information processing devices on the network segment 2, the communications with the uninspected inspection target node 90 can be also guided to the network monitoring device 20.

Other information processing devices on the network segment 2 and the router which receive the communication guidance GARP packet transmitted from the network monitoring device 20, normally register and retain, in the address list, the notified content, i.e., the MAC address of the network monitoring device 20 as the MAC address associated with the IP address of the inspection target node 90. Hence, hereafter, when the communications addressed to the inspection target node 90 come in from the external network, it follows that the router 10 transmits the packet addressed to the masqueraded MAC address of the network monitoring device 20. Further, other information processing devices on the network segment 2 transmit the packet, which is desired to be sent to the inspection target node 90, to the masqueraded MAC address of the network monitoring device 20. Then, the network monitoring device 20, in general, does not forward but discards the packet transmitted to the uninspected inspection target node 90 in a way that excludes the communication needed for the inspection. In other words, the communication cut-off unit 21 of the network monitoring device 20 cuts off the communications to the uninspected inspection target node 90 by the method described above. Thereafter, the processing proceeds to step S104.

Note that if the inspection target node 90 is such a type of terminal as not to transmit the GARP packet for checking the overlapped IP address, the processes ranging from step S101 to step S103 illustrated in the flowchart are not executed. Therefore, the connection of the inspection target node 90 may be detected by detecting the communication of the packets other than the GARP packet. For example, the connection of the inspection target node 90 may be detected by receiving other broadcast packets transmitted from the inspection target node 90 and may also be detected by operating a NIC (Network Interface Card) 15 in a promiscuous mode and thus acquiring the broadcast packet and even a packet not addressed to the network monitoring device 20.

In steps S104 and S105, along with the detection of the communications flowing from the inspection target node 90, the communications from the inspection target node 90 are guided to the network monitoring device 20. In the case of succeeding in the communication guidance in step S102, the inspection target node 90 does not make the ARP request for the communications with the external network but performs the communications in which the MAC address of the router 10 defined as the default gateway is set to the destination MAC address, however, if the terminal with which the inspection target node 90 wants to perform the communications is another information processing terminal connected to the network segment 2 and if the communication guidance gets into a failure (unsuccessful) in step S102, the inspection target node 90 participating in the network broadcasts the ARP request in order to perform the communications with the want-to-communicate terminal (e.g., the operation server 50). Then, the transmitting/receiving unit 25 of the network monitoring device 20 receives the ARP request transmitted by the inspection target node 90 (step S104).

Herein, if being a general type of network, if the terminal with which the inspection target node 90 wants to perform the communications is the terminal existing in the external network such as the operation server 50 (outside the network segment 2), it follows that the router 10 notifies of the router's own MAC address, and, whereas if the terminal with which the inspection target node 90 wants to perform the communications is the information processing device on the network segment 2, it follows that the communication target information processing device notifies of the device's own MAC address. However, in the network architecture (topology) according to the embodiment, the network monitoring device 20 is connected to the network segment 2, and, when receiving the ARP request transmitted by the inspection target node 90, the first communication guidance unit 23 of the network monitoring device 20 notifies the inspection target node 90 of the device's own MAC address (of the network monitoring device 20) (step S105).

The network monitoring device 20 according to the embodiment involves using the ARP request for notifying of the communication guidance MAC address through the network monitoring device 20. To be specific, the first communication guidance unit 23 of the network monitoring device 20 transmits, to the inspection target node 90, the ARP request for notifying of the MAC address of the network monitoring device 20 as the MAC address associated with the IP address of the terminal with which the inspection target node 90 wants to perform the communications. Namely, the MAC address notified as the ARP request to the inspection target node 90 masquerades the MAC address of another terminal within the network segment 2 with the MAC address of the network monitoring device 20. Therefore, in the network monitoring device 20 according to the embodiment, it follows that the uninspected inspection target node 90 registers, in the address list, the MAC address of the network monitoring device 20 as the MAC address of another terminal within the network segment 2. In other words, the ARP request transmitted in step S105 is the communication guidance ARP request for inducing the inspection target node 90 to communicate with the network monitoring device 20 and thus guiding the subsequent communications with the internal network (the network segment 2) from the inspection target node 90. Thereafter, the processing advances to step S106.

It should be noted that the communications are guided by transmitting the ARP request to the inspection target node 90 in the embodiment, however, an available substitute for this technique is that the communications are guided by transmitting an ARP response to the ARP request received in step S104. Further, the case that the communication guidance ARP request transmitted from the network monitoring device 20 is determined not to be the request for notifying of the valid MAC address with the result that the notified content is not retained depending on the inspection target node 90, is similar to the process explained in step S102.

In step S106, the communications with the inspection target node 90 from the external network are guided to the network monitoring device 20. The second communication guidance unit 24 of the network monitoring device 20 transmits, to the router 10, the communication guidance GARP packet for notifying of the MAC address of the network monitoring device 20 as the MAC address associated with the IP address of the inspection target node 90. This packet is similar to the GARP packet transmitted in step S103. Moreover, in step S106 also, similarly to step S103, the GARP packet similar to the packet transmitted to the router 10 may also be transmitted to other information processing devices on the network segment 2. This scheme, inducing other information processing devices existing on the network segment 2 to communicate with the network monitoring device 20 and thus, with respect to the communications from other information processing devices on the network segment 2, enables the communications with the uninspected inspection target node to be guided to the network monitoring device 20. Thereafter, the processing proceeds to step S107.

In step S107, the ARP response is received. The transmitting/receiving unit 25 of the network monitoring device 20 receives the ARP response to the ARP request transmitted in step S105. The ARP response, though transmitted from the inspection target node 90 and serving to notify the network monitoring device 20 of the MAC address of the network monitoring device 20, is transmitted as the response to the ARP request and therefore becomes a criterion for determining that the communication guidance is neither discarded nor cut off in step S105 in the inspection target node 90. Note that if the ARP response given from the inspection target node 90 is not received under a predetermined condition in step S107 (e.g., if a response ratio is equal to or smaller than a threshold value or if the response gets into timeout, etc), the network monitoring device 20 may determine that the communication guidance gets into the failure. The predetermined condition for determining the failure in the communication guidance will hereinafter be mentioned in the discussion on step S202. Thereafter, the processes illustrated in this flowchart are finished, and the processing proceeds to a periodic guidance process that will be described with reference to FIG. 5.

Note that when receiving the ARP response from the inspection target node 90, there is a possibility that the communication guidance becomes successful, however, it can not be confirmed that the communication guidance MAC address is actually registered in the address list of the inspection target node 90. Depending on the embodiment, however, the reception of the ARP response from the inspection target node 90 leads to the determination that the communication guidance becomes successful, and a communication guidance canceling process, which will hereinafter be described with reference to FIG. 6, may be executed.

After the communication guidance process explained with reference to the flowchart illustrated in FIG. 4, the uninspected inspection target node 90 becomes, till the inspection server 30 completes the inspection, a target of the periodic guidance process, the communication guidance canceling process and the communication cut-off process that will be described with reference to FIGS. 5 through 7. Note that the network monitoring device 20 retains the terminal identifying information such as the MAC address of each of the inspection target nodes 90 of which the inspection is completed by the inspection server 30, and these inspection target nodes 90 are recognized as the inspected terminals but do not hereafter become the targets of the communication guidance process described above, the periodic guidance process, the communication guidance canceling process and the communication cut-off process that will hereinafter be described till their inspected statuses are lost for the reason such as expiration of an effective inspection period.

Figure 5:
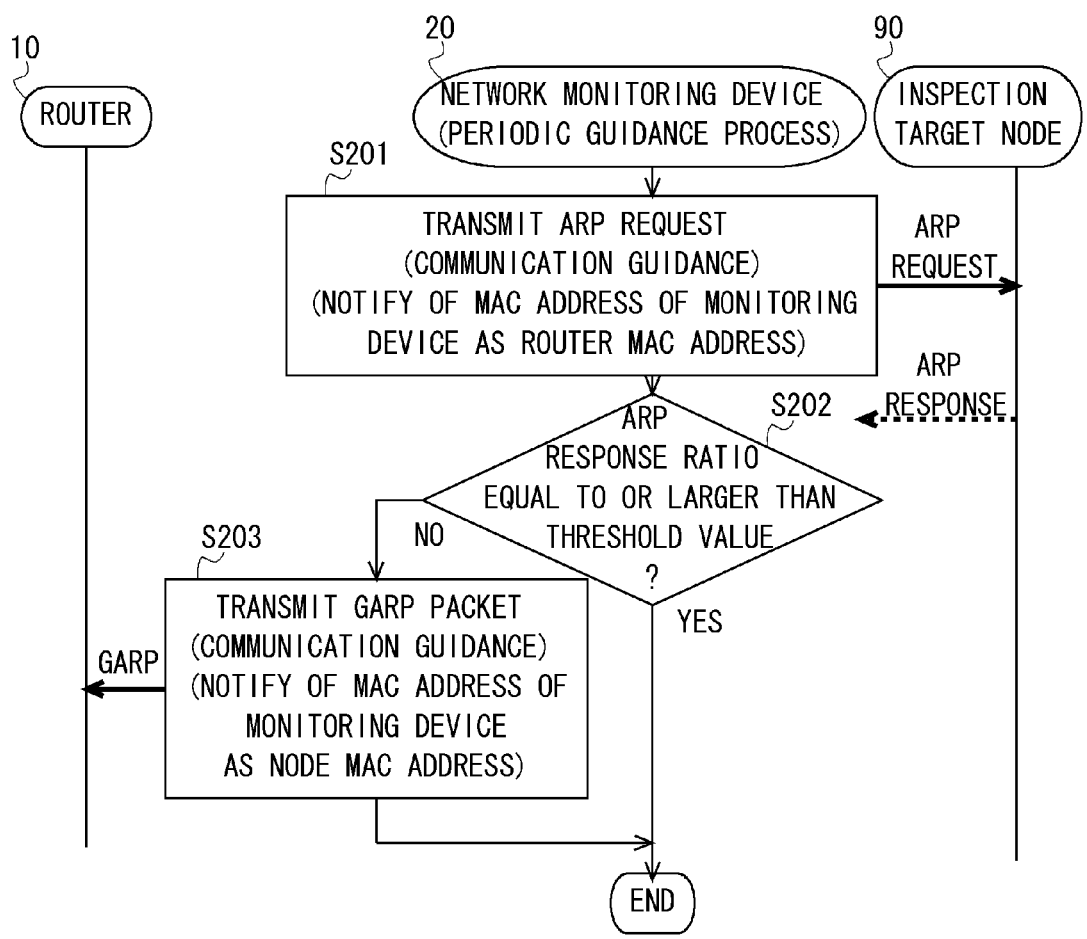
FIG. 5 is a flowchart illustrating a flow of a periodic guidance process according to the embodiment.

FIG. 5 is a flowchart illustrating a flow of the periodic guidance process according to the embodiment. A start of the periodic guidance process for the uninspected inspection target node 90 according to the embodiment is triggered by an end of the communication guidance process explained with reference to FIG. 4. Note that the specific content and the specific processing sequence of the process given in the flowchart are each one example for carrying out the present invention. The specific content and the specific processing sequence of the process given in the flowchart may be properly selected corresponding to the embodiment of the present invention.

In step S201, the communication guidance ARP request is transmitted. The first communication guidance unit 23 of the network monitoring device 20 transmits the communication guidance ARP request to the inspection target node 90 periodically (e.g., on a per-minute basis). The ARP request transmitted herein is, similarly to the ARP request explained in step S102, the ARP request for notifying of the MAC address of the network monitoring device 20 as the MAC address associated with the IP address of the router 10. Thereafter, the processing proceeds to step S202.

In steps S202 and S203, it is determined whether the ARP response is received based on a predetermined condition or not, and, if the ARP response is not received based on the predetermined condition, the communications with the inspection target node 90 from another terminal are guided to the network monitoring device 20. In step S201, when the communication guidance ARP request is transmitted, the guidance failure determining unit 27 determines whether or not the ARP response to the transmitted ARP request is received based on the predetermined condition (step S202). Herein, the term "predetermined condition" connotes a condition set for determining whether the first communication guidance unit 23 succeeds in the communication guidance or not, and the predetermined condition set in the embodiment is that a response ratio given when transmitting the ARP request for 3 sec at an interval of 250 ms (milliseconds) is larger than the preset threshold value (e.g., 50%). It is, however, preferable that the condition set for determining whether or not the first communication guidance unit 23 succeeds in the communication guidance is properly set according to the embodiment. For example, the threshold value may take a different value, and an event that the ARP response is received within a predetermined period of time since the ARP request has been transmitted (in other words, the ARP response is received without getting into the timeout), is set as the predetermined condition.

If the ARP response is not received based on the predetermined condition from the inspection target node 90, the guidance failure determining unit 27 determines that the communication guidance gets into the failure, and the second communication guidance unit 24 transmits the communication guidance GARP packet for notifying of the MAC address of the network monitoring device 20 as the MAC address associated with the IP address of the inspection target node 90 to other terminals such as the router 10 and other information processing devices on the network segment 2 (step S203). This packet is similar to the GARP packet transmitted in step S106. Specifically, the second communication guidance unit 24, if the guidance failure determining unit 27 determines that the first communication guidance unit 23 has failed to guide the communications, guides, to the network monitoring device 20, the communications with the inspection target node 90 from other terminals such as the router 10 and other information processing devices on the network segment 2. Thereafter, the processes given in the flowchart are repeated periodically (e.g., on the per-minute basis).

According to the processes explained with reference to the flowchart, the periodic determination as to whether the communication guidance for the inspection target node 90 is effective or ineffective enables the second communication guidance unit 24 to perform, only in a necessary case, the communication guidance for the router 10 and other information processing devices in accordance with a change in behavior of the inspection target node 90 due to a validated or invalidated function of analyzing the consistency of the communication content as by, e.g., security software (which is, in other words, the function of causing the failure in the communication guidance for the inspection target node 90) but disables the second communication guidance unit 24 from performing, in an unnecessary case (in which the communication guidance for the inspection target node 90 is considered to be successful), the communication guidance for the router 10 and other information processing devices.

Note that when receiving the ARP response from the inspection target node 90, a possibility is that the communication guidance gets successful, however, it is not yet confirmed that the communication guidance MAC address is registered in the address list of the inspection target node 90, and hence the determination is suspended. Depending on the embodiment, however, the communication guidance may be determined to be successful from such an event that the ARP response is received based on the predetermined condition from the inspection target node 90, and the communication guidance canceling process, which will hereinafter be described with reference to FIG. 6, may also be executed.

Figure 6:
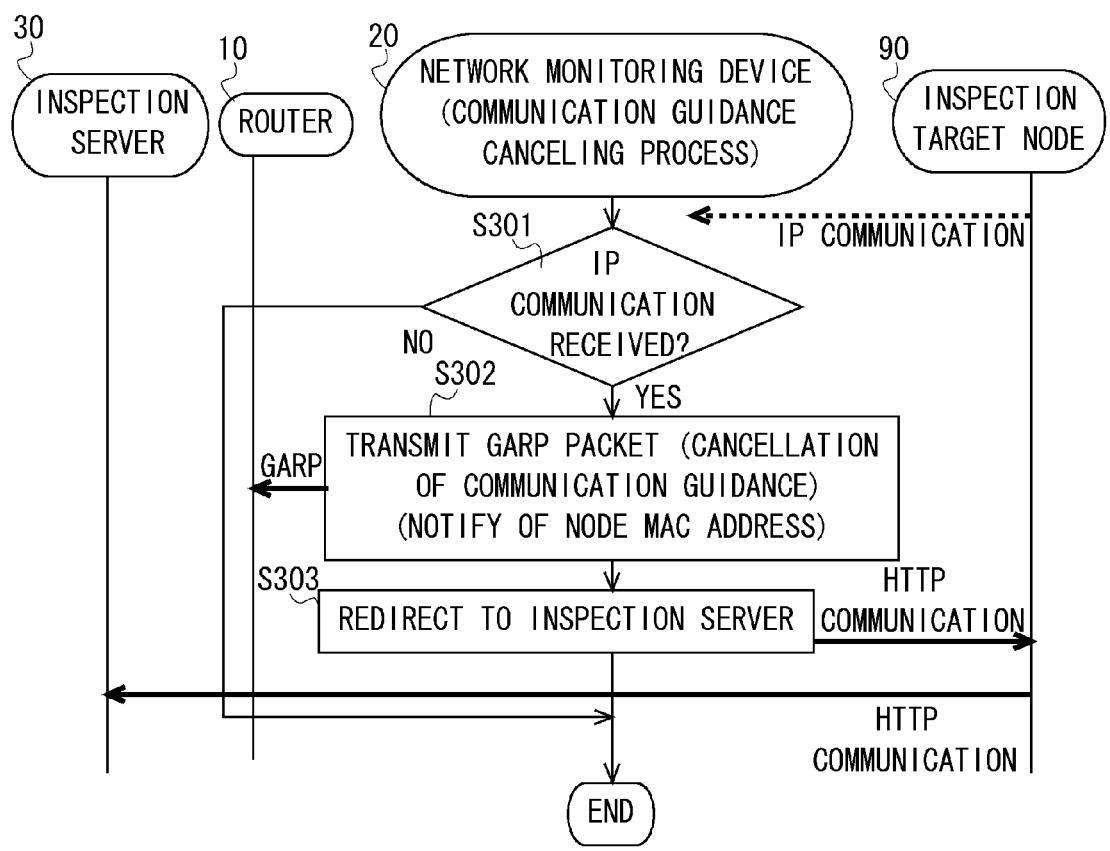
FIG. 6 is a flowchart illustrating a flow of a communication guidance canceling process according to the embodiment.

FIG. 6 is a flowchart illustrating a flow of the communication guidance canceling process according to the embodiment. A start of the communication guidance canceling process according to the embodiment is triggered by an event that the transmitting/receiving unit 25 of the network monitoring device 20 receives, from the uninspected inspection target node 90, an IP packet in which the MAC address of the network monitoring device 20 is set in the destination MAC address field. Note that the specific content and the specific processing sequence of the process given in the flowchart are each one example for carrying out the present invention. The specific content and the specific processing sequence of the process given in the flowchart may be properly selected corresponding to the embodiment of the present invention.

In step S301, the determination as to whether the communication guidance gets successful or unsuccessful is made based on the destination IP address and the destination MAC address of the reception packet. When the transmitting/receiving unit 25 receives the packet transmitted from the uninspected inspection target node 90 (i.e., the packet in which the address of the inspection target node 90 is set in the source address field), the guidance success determining unit 26 of the network monitoring device 20 determines whether or not the received packet is the packet in which the IP address of an arbitrary information processing device is set in the destination IP address field and the MAC address of the network monitoring device 20 is set in the destination MAC address field. Herein, the term "arbitrary information processing device" connotes the terminal, with which the inspection target node 90 wants to perform the communication, such as the operation server and another information processing device within the network segment 2. Namely, this step involves checking whether or not the communications with the arbitrary information processing device are performed in a way that sets the MAC address of the network monitoring device 20 in the destination MAC address field, thereby determining whether the communication guidance conducted in step S102 and step S105 is effective or not.

If the MAC address of the network monitoring device 20 is set in the destination MAC address of the reception packet addressed to the arbitrary information processing device, the communication guidance MAC address is actually registered in the address list of the inspection target node 90, and the communication guidance can be determined to be successful. In this case, the processing proceeds to step S302. In cases other than this case, the processes illustrated in this flowchart are terminated.

In step S302, the communication guidance of the second communication guidance unit 24 is canceled. If the communication guidance of the first communication guidance unit 23 is determined to be successful, the communication guidance canceling unit 28 of the network monitoring device 20 transmits the GARP packet for notifying of the MAC address (i.e., the valid MAC address) of the inspection target node 90 as the MAC address associated with the IP address of the inspection target node 90 to other terminals such as the router 10 and the other information processing devices on the network segment 2. Namely, this GARP packet is the communication guidance cancellation GARP packet for canceling the communication guidance of the second communication guidance unit 24, which is conducted in step S103 and step S106. Thereafter, the processing proceeds to step S303.

In step S303, the communications are redirected. The redirect unit 22 of the network monitoring device 20, if the communications acquired from the inspection target node 90 now undergoing the cut-off of the communications are classified as HTTP (HyperText Transfer Protocol) communications, redirects the communications so as to establish a connection with the inspection server 30 irrespective of the communication partner device designated in an HTTP connection request. The inspection target node 90, when receiving a redirect request, connects with the predetermined inspection server 30 of which the network monitoring device 20 notifies. Note that on this occasion, the MAC address of the network monitoring device 20 is set in the destination MAC address of the packet transmitted from the inspection target node 90, however, the network monitoring device 20 does not cut off (discard) the packet in which the (address of) inspection server 30 is set in the destination IP address but forwards this packet to the inspection target node 90.

Hereafter, during the inspection target node 90 remains in a uninspected status, the network monitoring device 20 forwards the packet in which (the address of) the inspection server 30 is set in the destination IP address field and discards (cuts off the communications) the packets other than this packet. Owing to this process, the inspection target node 90 can receive the inspection service while ensuring the security of the network segment 2. It is to be noted that the requirement for forwarding the packet is determined by referring to the destination IP address in the embodiment, however, other techniques may also be adopted. For example, the forwarding requirement may also be determined by referring to, in addition to the destination IP address, a type of the protocol, a port number, a URL (Uniform Resource Locator), etc.

Upon establishing the connection with the inspection server 30 through the redirect process and completing the inspection of the inspection server 30, the inspection target node 90 hereafter comes to an inspected status and is, as the communication restrictions explained in the embodiment are canceled, excluded from the processing target of the communication guidance process, the periodic guidance process and the communication guidance canceling process each described above and also a communication cut-off process that will be explained below.

Further, the communication guidance canceling unit 28 of the network monitoring device 20, when the inspection target node 90 has come to the inspected status, notifies this inspected inspection target node 90 of the valid MAC address of the masqueraded destination (e.g., the operation server 50 or another information processing device) and also notifies the router 10 and the terminals existing on the network segment 2 of the valid MAC address of the inspected inspection target node 90, thereby canceling the communication guidance of the first communication guidance unit 23 and the second communication guidance unit 24.

FIG. 7 is a flowchart illustrating a flow of the communication cut-off process according to the embodiment. A start of the communication cut-off process according to the embodiment is triggered by an event that the network monitoring device 20 receives the IP packet of which the communication is targeted at the uninspected inspection target node 90. Note that the specific content and the specific processing sequence of the process given in the flowchart are each one example for carrying out the present invention. The specific content and the specific processing sequence of the process given in the flowchart may be properly selected corresponding to the embodiment of the present invention.

The inspection target node 90, if the communication guidance of the network monitoring device 20 does not effectively operate, performs the communications with other information processing devices such as the operation server 50 in a way that designates the valid IP address and the valid MAC address. Herein, the "valid MAC address" is the MAC address of the communication target terminal if the communication target terminal is the terminal existing on the network segment 2, and also is the MAC address of the router 10 defined as the default gateway if the communication target terminal is the terminal existing on the external network. If the communication target terminal is the terminal on the network segment 2, the transmission packet reaches the communication target terminal, however, a reply packet from the communication target terminal is, when transmitted by the communication target terminal (e.g., the terminal etc on the network segment 2), sent to the network segment 2 in a way that registers the MAC address of the network monitoring device in the destination MAC address field. Further, if communicated via the router 10, the transmission packet reaches the communication target terminal (e.g., the operation server 50 etc), however, the reply packet from the communication target terminal is, when relayed by the router 10, sent to the network segment 2 in a way that registers the MAC address of the network monitoring device 20 in the destination MAC address field. This is because the communication guidance in steps S103 and S106 described above operates for the router 10 and the terminals on the network segment 2.

Namely, according to the network monitoring device 20 in the embodiment, if the communication guidance for the router 10 gets successful even in such a case the communication guidance for the inspection target node 90 gets into the failure, it is feasible to guide, to the network monitoring device 20, the IP packet in the communications between the inspection target node 90 and another information processing terminal, which has been transmitted to the inspection target node 90 from another information processing terminal.

In step S401 and step S402, the reply packet to the uninspected inspection target node 90 is received and discarded, thereby cutting off the communications with the uninspected inspection target node 90. The transmitting/receiving unit 25 of the network monitoring device 20 receives the packet transmitted from each of the router 10 and the terminal on the network segment 2 (i.e., the packet in which the MAC address of each of the router 10 and the terminal on the network segment 2 is set in the source MAC address) (step S401). This packet is the packet in which the IP address of the uninspected inspection target node 90 is set in the destination IP address field and yet is received by the network monitoring device 20 because the communication guidance for the router 10 and the terminal on the network segment 2 becomes successful, with the result that the MAC address of the network monitoring device 20 is set in the destination MAC address thereof by these devices (the router 10 and the terminal on the network segment 2).

Then, the communication cut-off unit 21 of the network monitoring device 20, upon receiving the guided-as-a-result-of-communication-guidance packet (addressed) to the inspection target node 90, does not forward the packet to the inspection target node 90 but discards this packet (step S402). Namely, the network monitoring device 20 according to the embodiment enables, even in the case of the inspection target node 90 that is hard to guide the communications to the network monitoring device 20, the communications related to the inspection target node 90 to be restricted by cutting off the communications coming from another terminal to the inspection target node 90. Thereafter, the processes given in the flowchart are finished.

In the embodiment discussed with reference to the flowcharts illustrated in FIGS. 4 through 7, the notification of the MAC address for the communication guidance and canceling the communication guidance is given by use of the ARP request (including the GARP packet) and the ARP response, however, the method used for notifying of the MAC address is not limited to the embodiment discussed with reference to the flowcharts. For example, in step of notifying of the MAC address by use of the ARP request, it is feasible to notify of the MAC address by employing the ARP response, and, in step of notifying of the MAC address by use of the GARP packet, it is possible to notify of the MAC address by employing the normal ARP request. Further, the notification of the MAC address may involve using other protocols.

What is claimed is:

1. A communication monitoring device to monitor a communication of an information processing device in a network, said communication monitoring device comprising:
   a first communication guidance unit to guide, to said communication monitoring device, the communication sent by a target device in said information processing devices with intent to be received by a device other than said communication monitoring device;
   a second communication guidance unit to guide, to said communication monitoring device, the communication sent by an information processing device other than said target device with intent to be received by said target device;
   a receiving unit to receive the communication addressed to said communication monitoring device;
   a guidance success determining unit to determine, if said receiving unit receives the communication addressed to said communication monitoring device from said target device, that said first communication guidance unit succeeds in the guidance; and
   a communication guidance canceling unit to cancel, if said guidance success determining unit determines that said first communication guidance unit succeeds in the guidance, the communication guidance of said second communication guidance unit.

2. A communication monitoring device according to claim 1, wherein said first communication guidance unit guides the communication coming from said target device to said communication monitoring device by notifying said target device of a physical address of said communication monitoring device as a physical address of another device, and
   said guidance success determining unit determines, if said receiving unit receives the communication addressed to the physical address of said communication monitoring device from said target device, that said first communication guidance unit succeeds in the guidance.

3. A communication monitoring device according to claim 1, wherein said second communication guidance unit guides, to said communication monitoring device, the communication to said target device from said information processing device other than said target device by notifying said information processing device other than said target device of the physical address of said communication monitoring device as the physical address of said target device, and
   said communication guidance canceling unit cancels the communication guidance of said second communication guidance unit by notifying said information processing device other than said target device of the physical address of said target device.

4. A communication monitoring device according to claim 1, wherein said second communication guidance unit guides, to said communication monitoring device, the communication, relayed by a communication relay device to relay the communication between said target device and the external network, to said target device from an external network by notifying said communication relay device of the physical address of said communication monitoring device as the physical address of said target device, and
   said communication guidance canceling unit cancels the communication guidance of said second communication guidance unit by notifying said communication relay device of the physical address of said target device.

5. A communication monitoring device according to claim 1, further comprising a guidance failure determining unit to determine, if a response to the guidance of said first communication guidance unit is not received based on a predetermined condition, that said first communication guidance unit fails in the guidance,
   wherein said second communication guidance unit, if said guidance failure determining unit determines that said first communication guidance unit fails in the guidance, guides, to said communication monitoring device, the communication to said target device from said information processing device other than said target device.

6. A communication monitoring device according to claim 5, wherein said first communication guidance unit periodically guides the communication to said communication monitoring device from said target device.

7. A communication monitoring device according to claim 1, further comprising a communication cut-off unit to cut off at least a part of the communication related to said target device by not forwarding at least a part of the guided communication.

8. A communication monitoring method by which a computer to monitor a communication of an information processing device in a network, executes:
   guiding, to said computer, the communication sent by a target device in said information processing devices with intent to be received by a device other than said computer;
   guiding, to said computer, the communication sent by an information processing device other than said target device with intent to be received by said target device;
   receiving the communication addressed to said computer;
   determining, if the communication addressed to said computer is received from said target device in said receiving, that the guidance gets successful in said guiding the communication from said target device; and
   canceling, if the guidance gets successful is determined to be successful in said determining, the communication guidance in said guiding the communication to said target device.

9. A non-transitory computer readable recording medium recorded with a communication monitoring program to make a computer to monitor a communication of an information processing device in a network, execute:

guiding, to said computer, the communication sent by a target device in said information processing devices with intent to be received by a device other than said computer;
guiding, to said computer, the communication sent by an information processing device other than said target device with intent to be received by said target device;
receiving the communication addressed to said computer;
determining, if the communication addressed to said computer is received from said target device in said receiving, that the guidance gets successful in said guiding the communication from said target device; and
canceling, if the guidance gets successful is determined to be successful in said determining, the communication guidance in said guiding the communication to said target device.

* * * * *